United States Patent [19]
Ichiba

[11] Patent Number: 5,970,817
[45] Date of Patent: *Oct. 26, 1999

[54] BRAKE OPERATING DEVICE

[75] Inventor: Yasuaki Ichiba, Susono, Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/585,102

[22] Filed: Jan. 16, 1996

[30] Foreign Application Priority Data

Jan. 27, 1995 [JP] Japan .................................... 7-011939

[51] Int. Cl.$^6$ ........................................................ G05G 1/14
[52] U.S. Cl. .................................. 74/512; 74/513; 74/560
[58] Field of Search .............................. 74/512, 513, 514, 74/560, 575; 192/111 A, 4 A

[56] References Cited

U.S. PATENT DOCUMENTS

| | | | |
|---|---|---|---|
| 4,399,901 | 8/1983 | Kobayashi et al. | 74/531 |
| 4,497,395 | 2/1985 | Nogami et al. | 74/512 |
| 4,779,480 | 10/1988 | Stocker | 74/513 |
| 4,875,385 | 10/1989 | Sitrin | 74/512 |
| 5,010,782 | 4/1991 | Asano et al. | 74/512 |
| 5,078,024 | 1/1992 | Cicotte et al. | 74/513 |
| 5,239,891 | 8/1993 | Stocker | 74/513 |
| 5,327,797 | 7/1994 | Seifrit | 74/512 |
| 5,460,061 | 10/1995 | Redding et al. | 74/512 |

FOREIGN PATENT DOCUMENTS

| | | | |
|---|---|---|---|
| 2516659 | 10/1975 | Germany | 74/512 |
| 5-170065 | 7/1993 | Japan | 74/560 |
| 5-185912 | 7/1993 | Japan | 74/512 |
| A-5-301565 | 11/1993 | Japan . | |

*Primary Examiner*—Vinh T. Luong
*Attorney, Agent, or Firm*—Oliff & Berridge, PLC

[57] ABSTRACT

In a brake operating device, a lever ratio changing apparatus interconnects a brake pedal assembly that has a brake pedal lever pivotally connected to a support structure at one end with a brake pedal member connected at an opposite end and a brake booster device. The lever ratio changing apparatus includes a connecting member, a guide member and a pivot pin element. The connecting member is movably connected at a first end to the brake pedal lever between the pivotal connection and the brake pedal member and an opposite second end movably connected to the brake booster device. The guide member is fixedly connected to the support structure. The pivot pin element is connected to the connecting member and is slidably movable within the guide member. As the brake pedal assembly moves from a non-braking position to a braking position, a leverage ratio R/r varies wherein R is defined as a first distance measured between the pivotal connection and the brake pedal member and r is a second distance measured between the pivotal connection and the pivot pin element.

9 Claims, 11 Drawing Sheets

BRAKE OPERATING DEVICE

BACKGROUND OF THE INVENTION

1. Field of the Invention

The present invention relates to a brake operating device which operates a brake device for braking a vehicle.

2. Description of the Related Art

Generally, a brake operating device which operates a brake device of a vehicle includes a brake pedal and a push rod (output member) connecting the brake pedal with a brake booster device. In the brake operating device, when a driver depresses the brake pedal, the swinging of the brake pedal is transmitted to the brake booster device via the push rod so as to operate the brake device.

Among such brake operating devices, a brake operating device provided with a so-called pedal ratio changing device which can vary the pedal ratio of the brake pedal has been proposed (e.g., Japanese Patent Application Laid-Open No. 5-301565).

In the brake operating device disclosed in the aforementioned laid-open application, the pedal ratio changing device is provided between the brake pedal and the push rod. The pedal ratio changing device is structured by a link, which is supported at the brake pedal and connected to the push rod by a guide pin, an elongated hole, which is formed in the brake pedal and into which a guide pin is inserted, and a return spring which is connected to the guide pin. In this way, the pedal ratio is changed at the time of normal braking operation and at the time of sudden braking operation, so that optimal braking operation can be implemented.

However, in the conventional brake operating device provided with the above-described pedal ratio changing device, the pedal ratio is changed by changing the position of the guide pin inserted into the elongated hole, in accordance with the swinging (depression) angle of the brake pedal or the depression force. The position of the guide pin is determined by the proportion of force by the brake pedal, the push rod and the return spring. However, frictional force is generated at the brake pedal, the push rod, and the return spring and at other parts as well, and the effect of this frictional force is great. As a result, a drawback arises in that it is difficult to reliably obtain a desired, stable pedal ratio, and it is easy for the input/output characteristic determined by the pedal ratio to become unstable.

SUMMARY OF THE INVENTION

In view of the aforementioned, an object of the present invention is to provide a brake operation device in which a predetermined, stable input/output characteristic of the operation amount of a brake pedal and the transmitted amount transmitted to a brake booster device can be obtained, and in which the input/output characteristic can easily be set to a desired form and the degrees of freedom in design increase, and in which these objects can be realized with a simple structure.

A first aspect of the present invention is a brake operating device which transmits swinging of a brake pedal, one end of which is supported so as to be swingable, to a brake booster device via an output member, one end of which is connected to the brake pedal and another end of which is connected to the brake booster device, comprising: a connecting member provided at a connecting portion of the brake pedal and the output member and changing a connecting position, at which the one end portion of the output member is connected to the brake pedal, along directions of approaching and moving away from a center of swinging of the brake pedal; and a guide member provided separately from and independently of the connecting member and guiding a specific portion of the output member along a predetermined path so as to change the connecting position by the connecting member, whereby a pedal ratio is varied in accordance with swinging of the brake pedal.

A second aspect of the present invention is a brake operating device which transmits swinging of a brake pedal, one end of which is supported so as to be swingable, to a brake booster device via an output member, one end of which is connected to the brake pedal and another end of which is connected to the brake booster device, wherein the output member is formed by a link mechanism including a pair of rods, and the brake operating device comprises a link guide member which varies a specific position of the link mechanism with respect to a locus of swinging of the brake pedal, whereby an input/output ratio of an amount of swinging of the brake pedal and a transmitted amount transmitted to the brake booster device is varied in accordance with swinging of the brake pedal.

In the brake operating device of the first aspect of the present invention, when the brake pedal is operated, the swinging of the brake pedal is transmitted to the brake booster device via the output member, and the brake device is operated.

Here, the pedal ratio of the brake pedal is defined as the ratio of the distance from the center of swinging of the brake pedal to the pedal depression-portion, to the distance from the center of swinging of the brake pedal to the connecting position of the output member.

In this case, the brake pedal and the output member are connected by the connecting member. The connecting position of one end portion of the output member to the brake pedal can be changed along directions of approaching and moving apart from the center of swinging of the brake pedal. As a result, when the brake pedal is swung, a specific portion of the output member is guided along a predetermined path by the guide member, and the connecting position by the connecting member is changed. Specifically, the distance from the center of swinging of the brake pedal to the connecting position of the output member is varied by the swinging caused by the depression of the brake pedal. Accordingly, the pedal ratio is varied along the path formed by the guide member, in accordance with the swinging of the brake pedal. Due to the varying of the pedal ratio, the transmitted amount transmitted to the brake booster device by the output member is a non-linear characteristic with respect to the amount of swinging (angle) of the brake pedal.

The varying of the pedal ratio is not carried out by using a spring or the like, but is carried out by the guiding of the specific portion of the output member along the predetermined path by the guide member. Therefore, frictional force does not adversely affect the pedal ratio (the frictional force is reduced), and a predetermined, stable pedal ratio can be obtained.

A pedal ratio corresponding to a desired input/output characteristic can easily be obtained by appropriately setting the path formed by the guide member. The degrees of freedom in design increase.

In this way, in the brake operating device of the first aspect of the present invention, a predetermined, stable input/output characteristic of the operation amount of the brake pedal and the transmitted amount transmitted to the brake booster device can be obtained. Further, the input/output characteristic can easily be set to a desired form, and the degrees of freedom in design increase. These advantages can be realized with a simple structure.

In the brake operating device of the second aspect of the present invention, when the brake pedal is operated, the swinging thereof is transmitted to the brake booster device via the output member, i.e., the link mechanism formed by the pair of rods, and the brake device is operated.

Here, when the brake pedal is swung, a specific position of the link mechanism (the pair of rods) is displaced, by the link guide member, with respect to the locus of swinging of the brake pedal. As a result, the transmitted amount transmitted to the brake booster device by the link mechanism is a non-linear characteristic with respect to the swinging amount (angle) of the brake pedal.

In this case, the varying of the input/output characteristic is not carried out by using a spring or the like, but is carried out by the guiding of the specific position of the link mechanism (the pair of link rods) along the predetermined path by the link guide member. Therefore, frictional force does not adversely affect the input/output characteristic (the frictional force is reduced), and a predetermined, stable input/output characteristic can be obtained.

Further, a desired input/output characteristic can easily be obtained by appropriately setting the form of the displacement of the intermediate connecting portion position by the link guide member.

In this way, in the brake operating device of the second aspect of the present invention, a predetermined, stable input/output characteristic of the operation amount of the brake pedal and the transmitted amount transmitted to the brake booster device can be obtained. Further, the input/output characteristic can easily be set to a desired form, and the degrees of freedom are increased. These advantages can be realized with a simple structure.

The above and other objects, features and advantages of the present invention will become apparent from the following description and the appended claims taken in conjunction with the accompanying drawings in which preferred embodiments of the present invention are shown by way of illustrative example.

DESCRIPTION OF THE PREFERRED EMBODIMENTS

Figure 1:
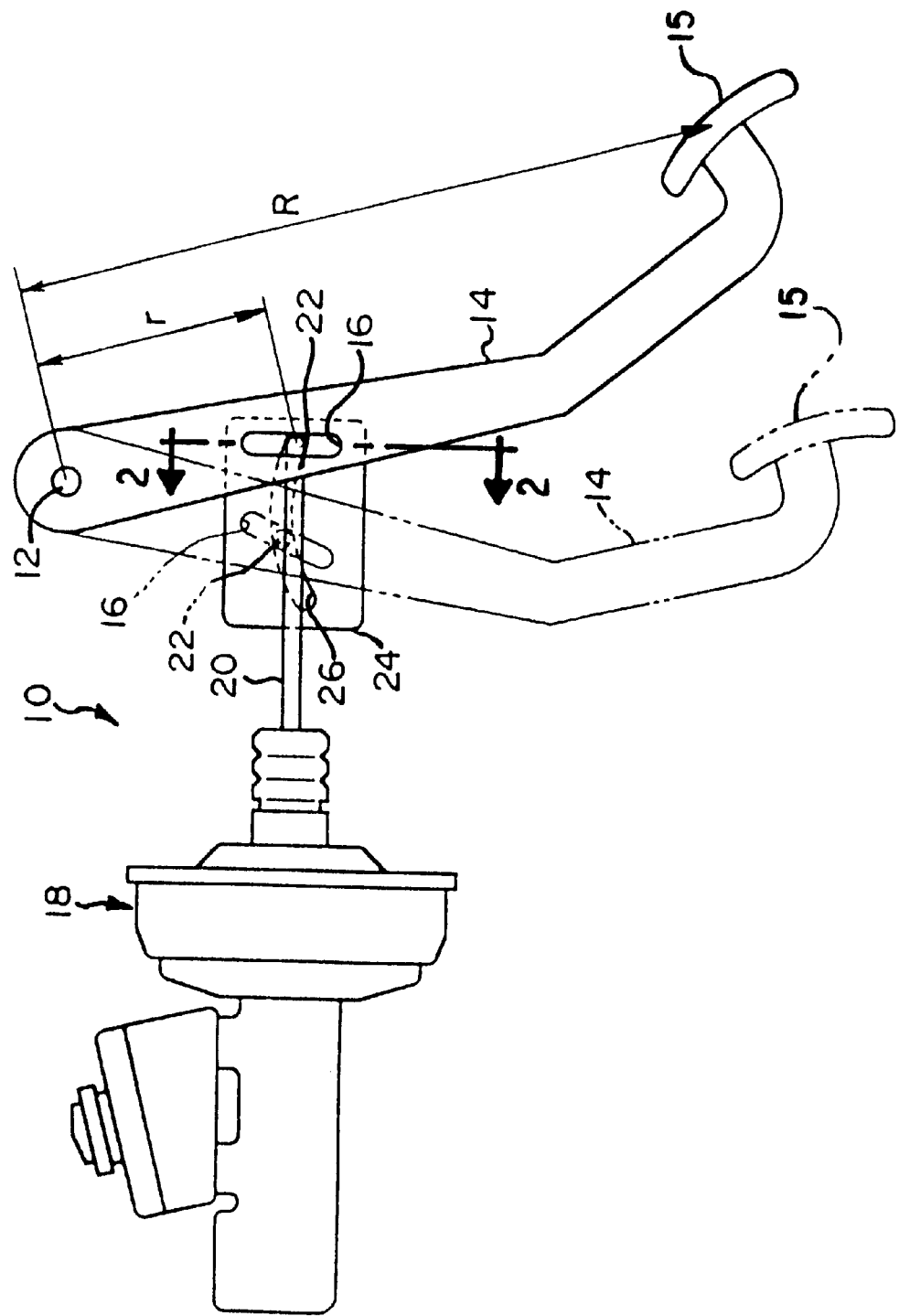
FIG. 1 is a front view illustrating a structure of a brake operating device relating to a first embodiment of the present invention.
Figure 2:
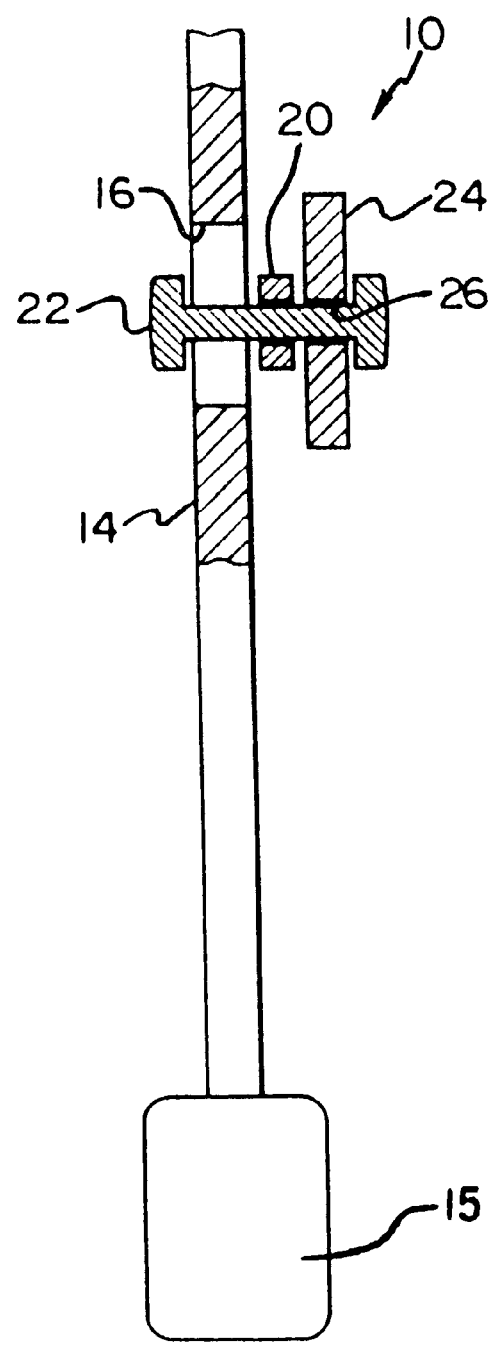
FIG. 2 is a partial cross-sectional view taken along line 2—2 of FIG. 1 illustrating the relationship between a brake pedal and a guide plate of the brake operating device relating to the first embodiment of the present invention.

A first embodiment of the present invention will be described hereinafter with reference to FIGS. 1 through 4.

In a brake operating device 10 relating to the first embodiment, one end portion of a brake pedal 14 is swingably supported by a supporting shaft 12. A connecting hole 16 forming a connecting member is formed in a longitudinally intermediate portion 13 of the brake pedal 14. The connecting hole 16 is an elongated hole which runs along the longitudinal direction of the brake pedal 14.

A connecting pin 22 forming a connecting member is provided at the distal end of a push rod 20 which serves as an output member and which cooperates with a brake booster device 18. The connecting pin 22 is fit in the connecting hole 16 of the brake pedal 14 so as to be movable along the longitudinal direction. As a result, when the brake pedal 14 is depressed and swung around the supporting shaft 12, the swinging is transmitted to the brake booster device 18 via the push rod 20. When the connecting pin 22 moves along the longitudinal direction of the connecting hole 16, the position at which the push rod 20 is connected to the brake pedal 14 approaches and moves away from the center of swinging of the brake pedal 14 (i.e., the supporting shaft 12).

A guide plate 24 is provided in a vicinity of the connecting hole 16 of the brake pedal 14. The guide plate 24 is provided separately from and independently of the brake pedal 14 and the push rod 20, and a guide hole 26 serving as a guide member is formed in the guide plate 24. The guide hole 26 is curved, and the connecting pin 22 which is fit in the connecting hole 16 is fit in the guide hole 26 so as to be movable. As a result, when the brake pedal 14 is depressed and swings around the supporting shaft 12, the connecting pin 22 moves while being guided along the guide hole 26. In other words, the guide hole 26 guides the connecting pin 22 along a predetermined path such that the connected position of the connecting pin 22 and the connecting hole 16 (the brake pedal 14) can be changed (i.e., the distance from the center of swinging of the brake pedal 14 can be changed).

The curved configuration of the guide hole 26 is set on the basis of the input/output characteristic which will be described later.

Operation of the first embodiment will now be described.

In the above-described brake operating device 10, when the brake pedal 14 is depressed, the swinging of the brake pedal 14 is transmitted to the brake booster device 18 via the push rod 20 so that the brake device is operated.

Here, the pedal ratio of the brake pedal 14 is defined as the ratio of R, the distance from the center of swinging of the brake pedal 14 (i.e., the supporting shaft 12) to the pedal depression-pressure portion 15, to r, the distance from the center of swinging of the brake pedal 14 to the connecting position of the push rod (i.e., the connecting pin 22).

In this case, the brake pedal 14 and the push rod 20 are connected by the connecting pin 22 and the connecting hole 16. The connecting position of the push rod 20 (the connecting pin 22) to the brake pedal 14 (the connecting hole 16) can be varied along directions of approaching and moving away from the center of swinging of the brake pedal 14. As a result, when the brake pedal 14 is swung, the connecting pin 22 of the push rod 20 is guided along the predetermined path by the guide hole 26 of the guide plate 24, and the position at which the connecting pin 22 is connected to the brake pedal 14 is changed. Specifically, the distance r from the center of swinging of the brake pedal 14 to the connecting position of the push rod 20 is varied by the swinging caused by the depression of the brake pedal 14.

Figure 3:
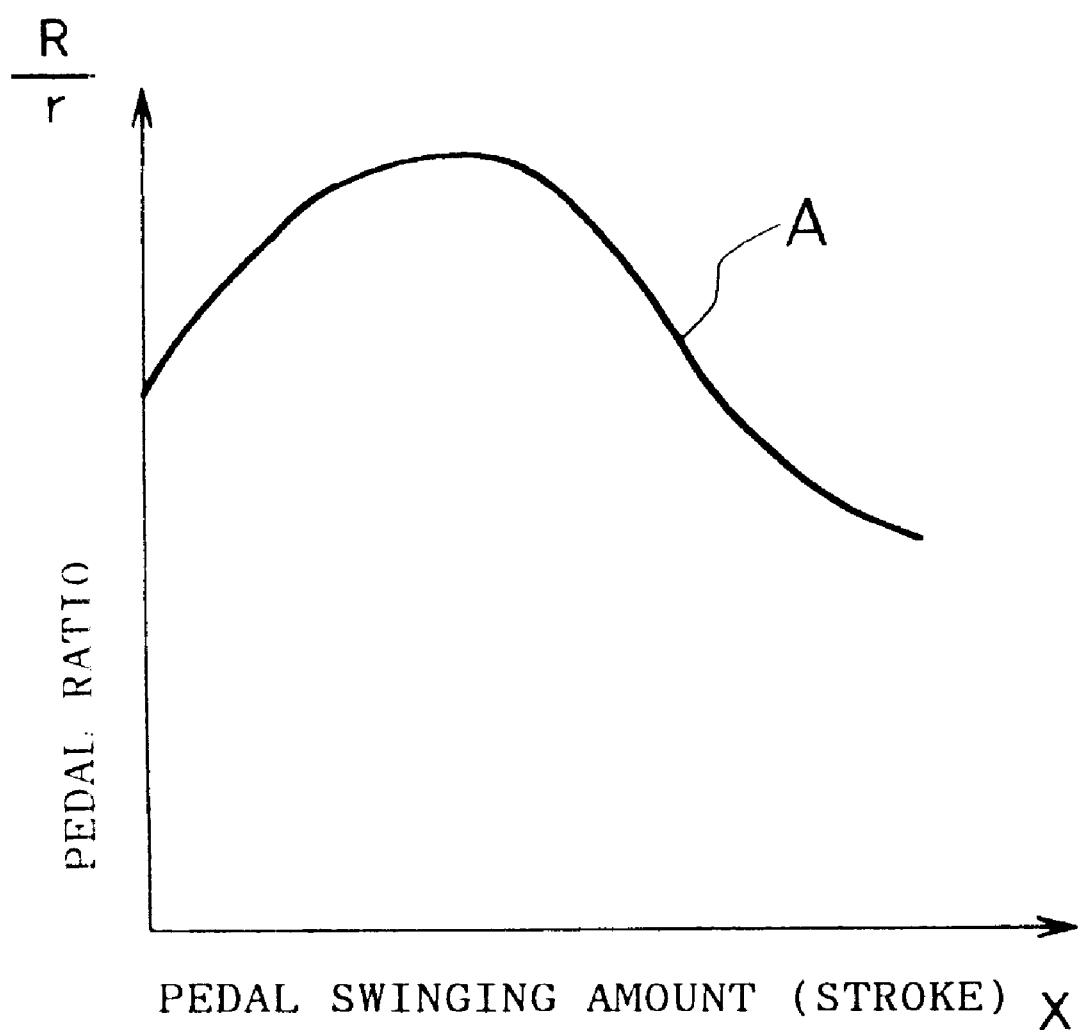
FIG. 3 is a graph illustrating variations in a pedal ratio of the brake operating device relating to the first embodiment of the present invention.

Accordingly, as shown by line A in FIG. 3, the pedal ratio is varied along the path formed by the guide hole 26 of the guide plate 24, in accordance with the swinging amount X of the brake pedal 14. Due to the varying of the pedal ratio, the transferred amount which is transferred to the brake booster device 18 by the push rod 20 is a non-linear characteristic with respect to the swinging amount (angle) of the brake pedal 14.

In this case, the varying of the pedal ratio is not carried out by using a spring or the like, but is carried out by the guiding of the connecting pin 22 of the push rod 20 along the predetermined path by the guide hole 26 of the guide plate 24 (The position of the connecting pin 22 is determined by the intersection of the connecting hole 16 and the guide hole 26.) Therefore, frictional force is reduced (the frictional force does not adversely affect the pedal ratio), and a predetermined, stable pedal ratio can be obtained.

A pedal ratio corresponding to a desired input/output characteristic can easily be obtained by appropriately setting the path formed by the guide hole 26 of the guide plate 24. The degrees of freedom in design are increased.

In this way, in the brake operating device 10 relating to the first embodiment, a predetermined, stable input/output characteristic of the operating amount of the brake pedal 14 and the transmitted amount transmitted to the brake booster device 18 can be obtained. Further, the input/output characteristic can easily be set to a desired form, and the degrees of freedom in design increase. Moreover, these advantages can be realized with a simple structure.

Figure 4:
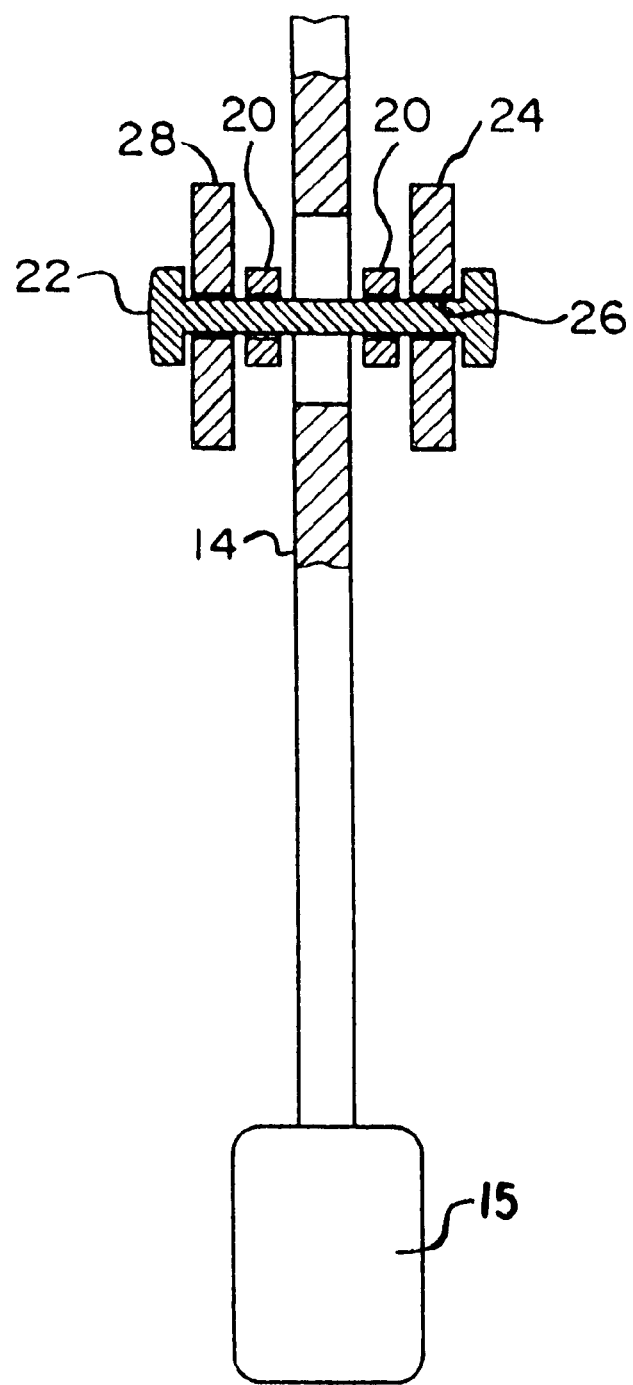
FIG. 4 is a cross-sectional view illustrating another example of the guide plate of the brake operating device relating to the first embodiment of the present invention.

In the brake operating device 10 relating to the first embodiment, only a single guide plate 24 is provided. However, the present invention is not limited to the same, and a plurality of guide plates may be provided. For example, as illustrated in FIG. 4, a guide plate 28 may also be provided and may be disposed such that the brake pedal 14 is interposed between the guide plate 24 and the guide plate 28, so that the connecting pin 22 cooperates with the respective guide plates 24, 28. In this case, the guiding of the connecting pin 22 of the push rod 20 becomes even more precise, and a predetermined, stable pedal ratio can be obtained.

Next, another embodiment of the present invention will be described. Parts which are basically the same as those of the first embodiment are denoted by the same reference numerals used in the first embodiment, and description thereof is omitted.

Figure 5:
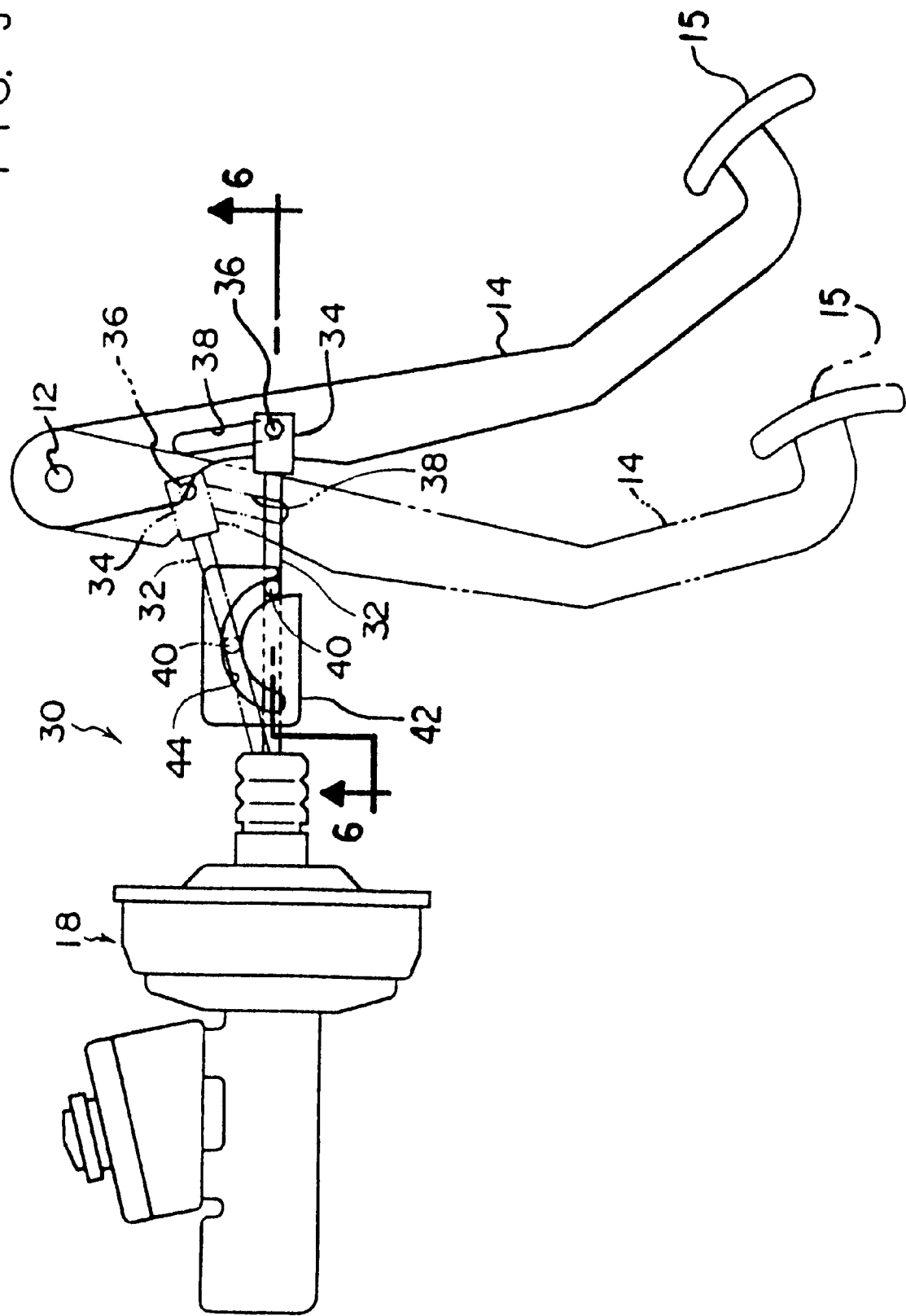
FIG. 5 is a front view illustrating a structure of a brake operating device relating to a second embodiment of the present invention.
Figure 6:
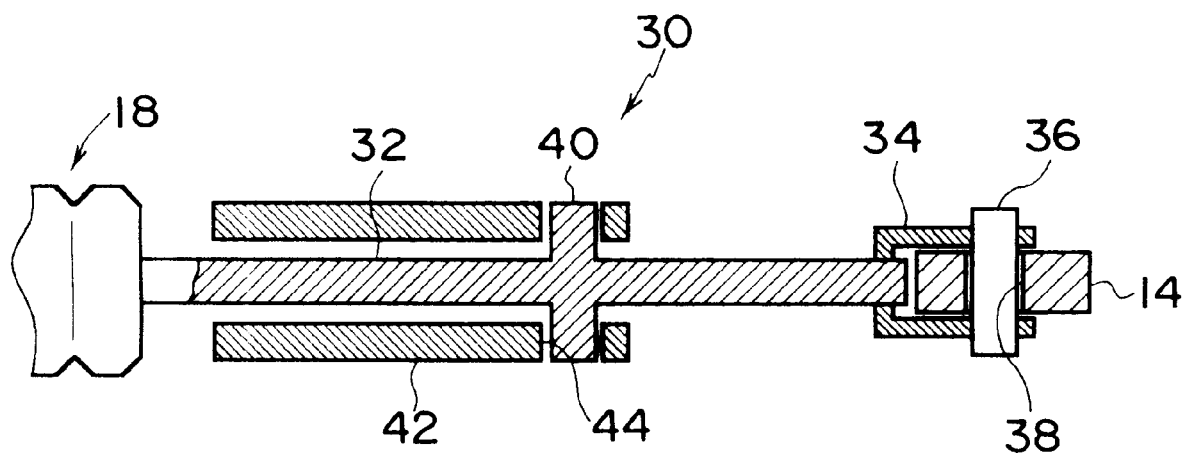
FIG. 6 is a partial cross-sectional view taken along line 6—6 of FIG. 5 illustrating the brake operating device relating to the second embodiment of the present invention.

FIG. 5 illustrates the overall structure of a brake operating device 30 relating to a second embodiment. FIG. 6 is a transverse sectional view of the brake operating device 30. In the brake operating device 30, a connecting pin 36, which forms a connecting member and is fixed to a holder 34, is provided at the distal end of a push rod 32 which serves as an output member and cooperates with the brake booster device 18. The connecting pin 36 is fit in a connecting hole 38 so as to be movable. The holder 34 is screwed with a push rod 32. By rotating the holder 34 along the screw, the entire length of the push rod 32 (the distance between the brake booster device 18 and the connecting pin 36) can be adjusted.

A guide pin 40 forming a guide member is fixed to a longitudinally intermediate portion 41 of the push rod 32.

A guide plate 42 is provided in a vicinity of the guide pin 40. The guide plate 42 is provided separately from and independently of the brake pedal 14 and the push rod 32. A guide hole 44 serving as a guide member is formed in the guide plate 42. The guide hole 44 is curved and opens at the end edge of the guide plate 42. The guide pin 40 is fit in the guide hole 44 so as to be movable. As a result, when the brake pedal 14 is depressed and swings around the supporting shaft 12, the guide pin 40 moves while being guided by the guide hole 44. In other words, the guide hole 44 guides the guide pin 40 along a predetermined path, and the connecting position of the connecting pin 36 and the connecting hole 38 (the brake pedal 14) can be changed (i.e., the distance from the center of swinging of the brake pedal 14 can be changed).

In the brake operating device 30 having the above-described structure, when the brake pedal 14 is operated, the swinging of the brake pedal 14 is transmitted to the brake booster device 18 via the push rod 32 so that the brake device is operated.

Here, the brake pedal 14 and the push rod 32 are connected by the connecting pin 36 and the connecting hole 38. The position at which the push rod 32 (the connecting pin 36) is connected to the brake pedal 14 (the connecting hole 38) can be changed along directions of approaching and moving away from the center of swinging of the brake pedal 14. As a result, when the brake pedal 14 is swung, the guide pin 40 of the push rod 32 is guided along the predetermined path by the guide hole 44 of the guide plate 42, and the position at which the connecting pin 36 is connected to the brake pedal 14 is changed. Specifically, the distance from the center of swinging of the brake pedal 14 to the connecting position of the push rod 32 is varied by the swinging caused by the depression of the brake pedal 14. Accordingly, the pedal ratio varies along the path formed by the guide hole 44 of the guide plate 42, in accordance with the swinging amount of the brake pedal 14. Due to the varying of the pedal ratio, the transferred amount transferred to the brake booster device 18 by the push rod 32 is a non-linear characteristic with respect to the swinging amount (angle) of the brake pedal 14.

In this case, the varying of the pedal ratio is not carried out by using a spring or the like, but is carried out by the guiding of the guide pin 40 of the push rod 32 along the predetermined path by the guide hole 44 of the guide plate 42. (The position of the connecting pin 36 is determined by the guide hole 44 and the guide pin 40.) As a result, frictional force does not adversely affect the pedal ratio (the frictional force is reduced), and a predetermined, stable pedal ratio can be obtained.

Further, a pedal ratio corresponding to a desired input/output characteristic can easily be obtained by appropriately setting the path formed by the guide hole 44 of the guide plate 42. The degrees of freedom in design are increased.

In this way, in the brake operating device 30 relating to the second embodiment, a predetermined, stable input/output characteristic of the operating amount of the brake pedal 14 and the transferred amount transferred to the brake booster device 18 can be obtained. The input/output characteristic can easily be set to a desired form, and the degrees of freedom in design increase. Further, these advantages can be realized with a simple structure.

Figure 7:
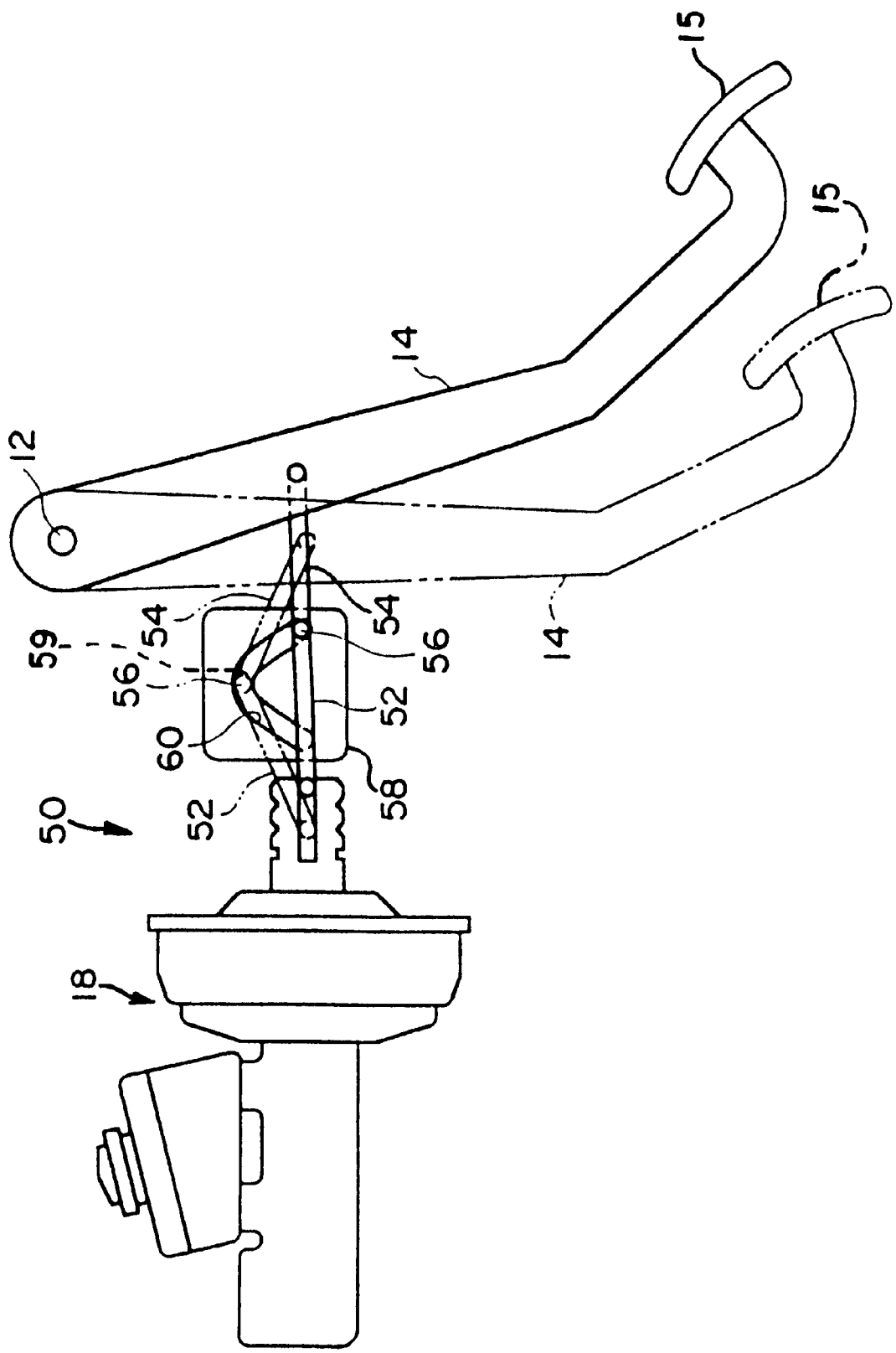
FIG. 7 is a front view illustrating a structure of a brake operating device relating to a third embodiment of the present invention.

FIG. 7 illustrates the overall structure of a brake operating device 50 relating to a third embodiment. The brake operating device 50 includes a link rod 52 and a link rod 54 serving as output members. The link rod 52 and the link rod 54 are connected together by a link pin 56. The link rod 52 cooperates with the brake booster device 18, and the link rod 54 is connected to the brake pedal 14. The link rods 52, 54 form a link mechanism.

A guide plate 58 is provided in a vicinity of the link pin 56 (i.e., at an intermediate connecting portion 59 of the link mechanism formed by the link rod 52 and the link rod 54). The guide plate 58 is provided separately from and independently of the brake pedal 14, the link rod 52 and the link rod 54. A guide hole 60 serving as a link guide member is formed in the guide plate 58. The guide hole 60 is curved, and the link pin 56 is fit therein so as to be movable. As a result, when the brake pedal 14 is depressed and swings around the supporting shaft 12, the link pin 56 moves while being guided along the guide hole 60. In other words, the guide hole 60 guides the link pin 56 along a predetermined path, and the intermediate connecting portion position of the link mechanism (the link rod 52 and the link rod 54) can be displaced with respect to the locus of swinging of the brake pedal 14.

In the brake operating device 50 having the above-described structure, when the brake pedal 14 is operated, the swinging of the brake pedal 14 is transmitted to the brake booster device 18 via the link mechanism formed by the link rod 52 and the link rod 54, so as to operate the brake device.

Figure 8:
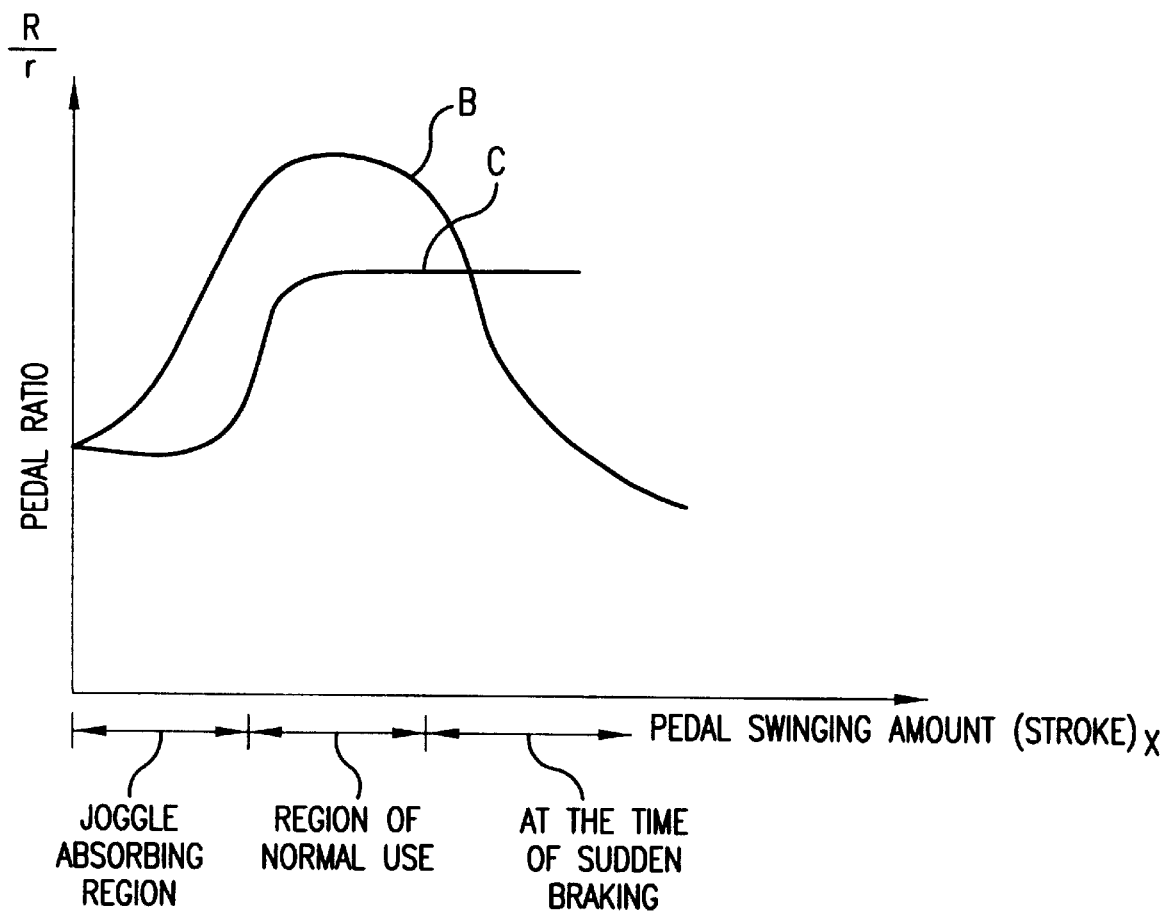
FIG. 8 is a graph illustrating an input/output characteristic of the brake operating device relating to the third embodiment of the present invention.

Here, when the brake pedal 14 is swung, due to the guide hole 60 of the guide plate 58, the position of the link pin 56 (the intermediate connecting portion of the link mechanism) is displaced with respect to the locus of swinging of the brake pedal 14. As a result, as shown by line B in FIG. 8, the transferred amount transferred to the brake booster device 18 by the link mechanism (the link rod 52 and the link rod 54) varies in accordance with the swinging amount (angle) X of the brake pedal 14. Specifically, the input/output ratio of the swinging amount of the brake pedal 14 and the transferred amount transferred to the brake booster device 18 is a non-linear characteristic with respect to the swinging amount of the brake pedal 14.

In this case, the varying of the input/output characteristic is not carried out by using a spring or the like, but is carried out by the guiding of the connecting portion of the link rod 52 and the link rod 54 (i.e., by the guiding of the link pin 56) along the predetermined path by the guide hole 60 of the guide plate 58. Therefore, frictional force does not adversely affect the input/output characteristic (the frictional force is reduced), and a predetermined, stable input/output characteristic can be obtained.

Figure 9:
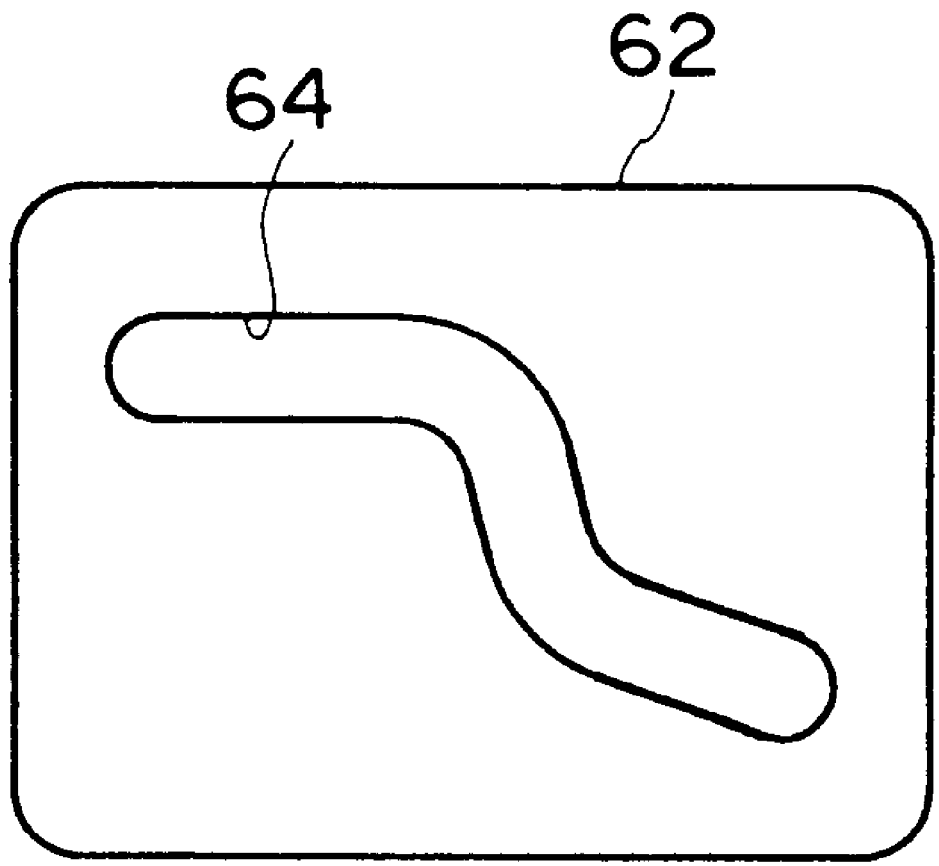
FIG. 9 is a front view illustrating another example of a guide plate of the brake operating device relating to the third embodiment of the present invention.

By varying the configuration of the guide hole 60 of the guide plate 58 and appropriately setting the displacement form of the link pin 56 (the intermediate connecting portion position of the link mechanism), a desired input/output characteristic can easily be obtained, and the degrees of freedom in design are increased. For example, when a guide hole 64 is formed in a crank-shape in a guide plate 62 illustrated in FIG. 9, as shown by line C in FIG. 8, the input/output characteristic of the swinging amount of the brake pedal 14 and the transmitted amount transmitted to the brake booster device 18 can be set to a characteristic which can absorb invalid strokes such as initial joggling or the like.

In this way, in the brake operating device 50, a predetermined, stable input/output characteristic of the operating amount of the brake pedal 14 and the transferred amount transferred to the brake booster device 18 can be obtained. The input/output characteristic can easily be set to a desired form, and the degrees of freedom in design increase. Further, these advantages can be realized with a simple structure.

Figure 10:
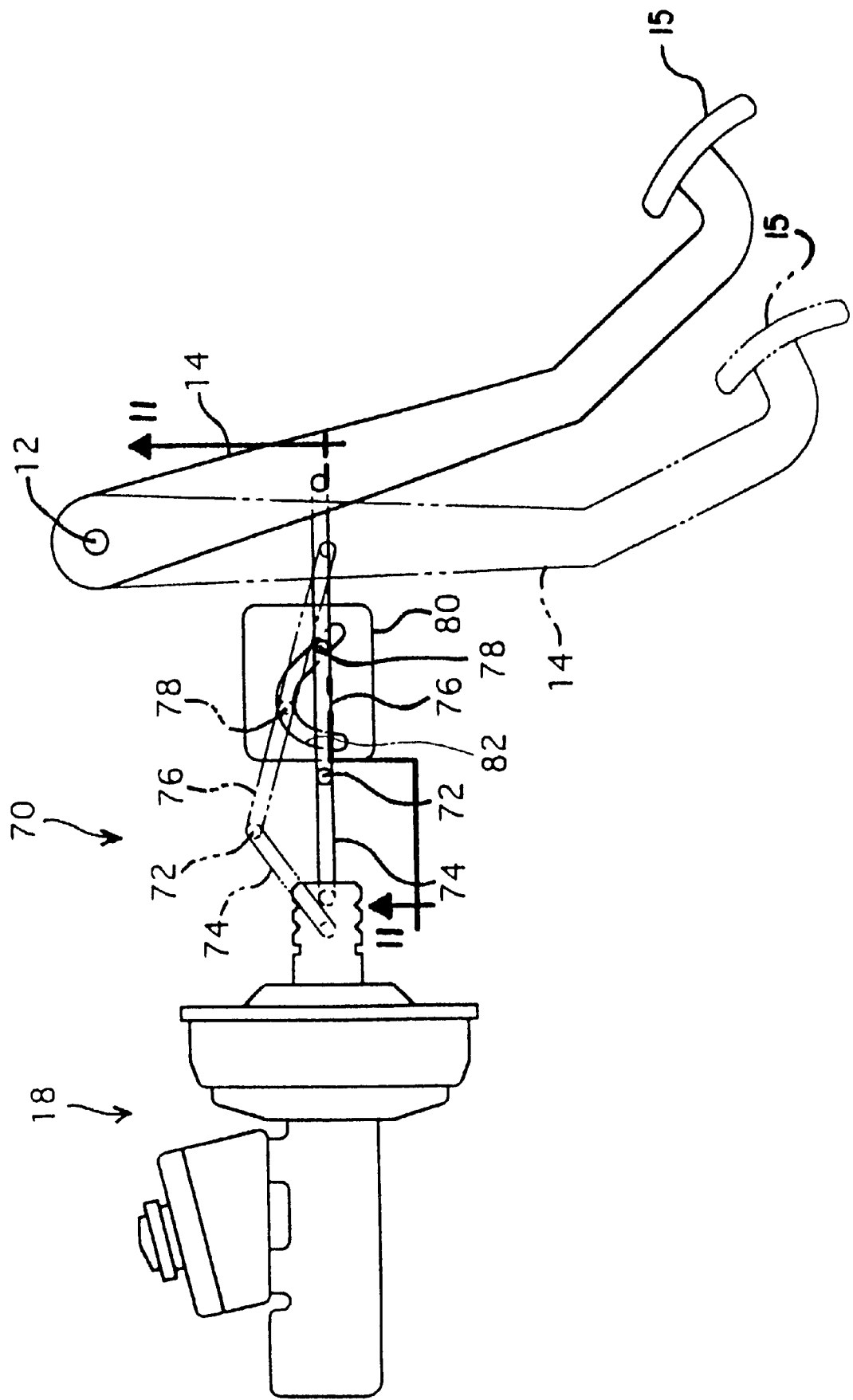
FIG. 10 is a front view illustrating a structure of a brake operating device relating to a fourth embodiment of the present invention.
Figure 11:
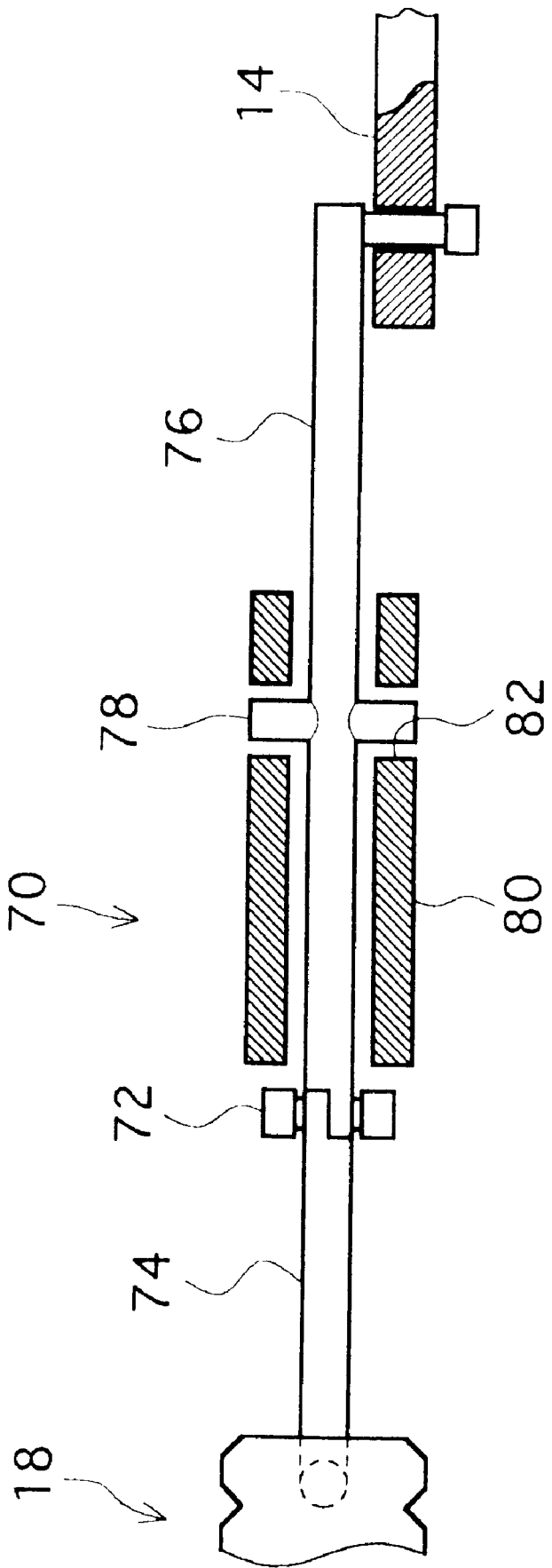
FIG. 11 is a partial cross-sectional view taken along line 11—11 of FIG. 10 illustrating the relationship between a link rod and a guide plate of the brake operating device relating to the fourth embodiment of the present invention.

FIG. 10 illustrates the entire structure of a brake operating device 70 relating to a fourth embodiment. FIG. 11 is a cross-sectional view of main portions of the brake operating device 70. The brake operating device 70 has basically the same structure as that of the brake operating device 50 relating to the third embodiment, but in the brake operating device 70, a guide pin 78 forming a link guide member is provided at a longitudinally intermediate portion of a link rod 76 which is connected to a link rod 74 by a link pin 72.

A guide plate 80 is provided in a vicinity of the guide pin 78. In the same way as the guide plate 58 of the brake operating device 50 relating to the third embodiment, a guide hole 82 serving as a link guide member is formed in the guide plate 80. The guide hole 82 is curved, and the guide pin 78 is fit therein so as to be movable. As a result, when the brake pedal 14 is depressed and swings around the supporting shaft 12, the guide pin 78 moves while being guided along the guide hole 82. In other words, the guide hole 82 guides the guide pin 78 along a predetermined path and displaces (inclines) the link rod 76 so that, as a result, the intermediate connecting portion position of the link mechanism (the link rod 74 and the link rod 76) can be displaced with respect to the locus of swinging of the brake pedal 14.

In the brake operating device 70 having the above-described structure, when the brake pedal 14 is swung, the guide pin 78 is guided by the guide hole 82 of the guide plate 80, the link rod 76 is inclined, and the position of the link pin 72 (the intermediate connecting portion of the link mechanism) is displaced with respect to the locus of swinging of the brake pedal 14. As a result, in the same way as in the above-described third embodiment, the transmitted amount transmitted to the brake booster device 18 by the link mechanism (the link rod 74 and the link rod 76) varies in accordance with the swinging amount (angle) X of the brake pedal 14. In other words, the input/output ratio of the swinging amount of the brake pedal 14 and the transmitted amount transmitted to the brake booster device 18 is a non-linear characteristic with respect to the swinging amount of the brake pedal 14.

In this case, the varying of the input/output characteristic is not carried out by using a spring or the like, but is carried out by the guiding of the guide pin 78 along the predetermined path by the guide hole 82 of the guide plate 80. Therefore, frictional force does not adversely effect the input/output characteristic (the frictional force is reduced), and a predetermined, stable input/output characteristic can be obtained. Further, by changing the configuration of the guide hole 82 of the guide plate 80 so as to appropriately set the displacement form of the guide pin 78, the desired input/output characteristic can easily be obtained, and the degrees of freedom in design increase.

In this way, in the brake operating device 70, a predetermined, stable input/output characteristic of the operating amount of the brake pedal 14 and the transferred amount transferred to the brake booster device 18 can be obtained. The input/output characteristic can easily be set to a desired form, and the degrees of freedom in design increase. Further, these advantages can be realized with a simple structure.

In the above-described third and fourth embodiments, when the brake pedal 14 is in a non-operated state, the link rod 52 and the link rod 54, or the link rod 74 and the link rod 76 are connected so as to be positioned on substantially the same axis. However, the present invention is not limited to the same. The guide plate 58 or the guide plate 80 may be disposed at a position offset from that axis, and the link rod 52 and the link rod 54, or the link rod 74 and the link rod 76, may be connected at a predetermined relative angle when the brake pedal 14 is in a non-operated state (i.e., may be connected so as to be bent on the whole). In this case, even if the distance between the brake pedal 14 and the brake booster device 18 is short (i.e., even if the space for disposing the respective elements is small), the link rod 52 and the link rod 54, or the link rod 74 and the link rod 76, can be arranged. The loadability of the brake operating device 50 and the brake operating device 70 into a vehicle improves, and the range of application thereof increases.

In accordance with the present invention structured as described above, a predetermined, stable input/output characteristic of the operating amount of the brake pedal and the transmitted amount transmitted to the brake booster device can be obtained. The input/output characteristic can easily be set to a desired form, and the degrees of freedom in design increase. Further, these advantages can be realized with a simple structure.

While the embodiments of the present invention, as herein disclosed, constitute a preferred form, it is to be understood that other forms might be adopted.

What is claimed is:

1. A brake operating device which transmits swinging of a brake pedal to a brake booster device wherein one end of the brake pedal is supported to be swingable and an opposite end of the brake pedal includes a pedal depression-pressure portion, said brake operating device, comprising:
a link mechanism output member including a pair of rods pivotally connected to each other; and
a link guide member disposed separately and independently of the brake pedal which varies a specific position of the link mechanism output member with respect to a locus of swinging of the brake pedal,
wherein an input/output ratio of an amount of swinging of the brake pedal and a transmitted amount transmitted to the brake booster device is varied in accordance with swinging of the brake pedal.

2. A brake operating device according to claim 1, wherein the pair of rods of the link mechanism output member are pivotally connected to each other by a link pin at an intermediate connecting portion of the link mechanism output member, and the specific position of the link mechanism output member is defined as a position of the intermediate connecting portion.

3. A brake operating device according to claim 2, wherein said link guide member includes a guide plate in which is formed a guide hole into which the link pin connecting the pair of rods is fittable so as to be movable.

4. A brake operating device according to claim 3, wherein the guide hole is curved.

5. A brake operating device according to claim 3, wherein the guide hole is formed in a crank-shaped configuration.

6. A brake operating device according to claim 1, wherein the pair of rods of the link mechanism are connected together by a link pin along a connecting portion position at a specific position, and the specific position is a longitudinally intermediate portion of one of the pair of rods.

7. A brake operating device according to claim 6, wherein said link guide member includes a guide pin, which is provided at the longitudinally intermediate portion of the one rod which portion is the specific position, and a guide plate in which is formed a guide hole into which the guide pin is fittable so as to be movable.

8. A brake operating member according to claim 7, wherein the guide hole is curved.

9. A brake operating device which transmits swinging of a brake pedal to a brake booster device wherein one end of the brake pedal is supported to be swingable, the brake operating device, comprising:

an output member including a pair of rods pivotally connected to each other by a link pin at an intermediate connecting portion of the output member; and a link guide member including a guide plate having guide hole into which the link pin is movable, the link guide member disposed separately and independently of the brake pedal varies a specific position of the output member with respect to a locus of swinging of the brake pedal wherein, the specific position is defined as a position of the intermediate connecting portion, and an input/output ratio of an amount of swinging of the brake pedal and a transmitted amount transmitted to the brake booster device is varied in accordance with swinging of the brake pedal.

* * * * *